(12) United States Patent
Taguchi et al.

(10) Patent No.: US 8,203,804 B2
(45) Date of Patent: Jun. 19, 2012

(54) HEAD GIMBAL ASSEMBLY AND DISK DRIVE WITH THE SAME

(75) Inventors: Tomoko Taguchi, Kunitachi (JP); Yuichi Yamada, Higashiyamato (JP); Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/174,647

(22) Filed: Jun. 30, 2011

(65) Prior Publication Data

US 2012/0092791 A1 Apr. 19, 2012

(30) Foreign Application Priority Data

Oct. 14, 2010 (JP) ................................. 2010-231877

(51) Int. Cl.
*G11B 5/127* (2006.01)
(52) U.S. Cl. ................................. 360/125.31
(58) Field of Classification Search ............. 360/125.31, 360/123.01, 125.14, 125.74, 110, 317, 245.3, 360/294.7, 234.4, 123.1, 125.3, 234.5, 125.26
See application file for complete search history.

(56) References Cited

U.S. PATENT DOCUMENTS

| 6,867,940 | B2 * | 3/2005 | Pleiss ............................... 360/59 |
| 7,675,716 | B2 * | 3/2010 | Kagami et al. ................ 360/319 |
| 2004/0252396 | A1 * | 12/2004 | Pleiss .............................. 360/55 |
| 2006/0256481 | A1 * | 11/2006 | Kagami et al. ................ 360/317 |
| 2009/0251821 | A1 * | 10/2009 | Song et al. ..................... 360/110 |
| 2009/0262460 | A1 * | 10/2009 | Hanchi et al. ............... 360/235.4 |
| 2010/0296194 | A1 * | 11/2010 | Gubbins et al. .......... 360/125.43 |
| 2010/0321816 | A1 * | 12/2010 | Saito .............................. 360/59 |

FOREIGN PATENT DOCUMENTS

| JP | 08-235556 | 9/1996 |
| JP | 2003-331404 | 11/2003 |
| JP | 3471285 | 12/2003 |
| JP | 2005-317178 | 11/2005 |
| JP | 2009-059417 | 3/2009 |
| JP | 2010-123172 | 6/2010 |

OTHER PUBLICATIONS

Japanese Application No. 2010-231877 Office Action (Jan. 10, 2012) (English translation attached).

* cited by examiner

*Primary Examiner* — Allen Cao
(74) *Attorney, Agent, or Firm* — Patterson & Sheridan, LLP

(57) ABSTRACT

According to one embodiment, a head gimbal assembly includes a magnetic head for perpendicular, a suspension supporting the magnetic head, and a heating module configured to locally heat a recording area of the recording medium. A head section of the magnetic head includes a magnetic core including a main pole and a return pole forming a magnetic circuit in conjunction with the main pole, a coil configured to excite magnetic flux in the magnetic circuit, and a thermal conductor having thermal conductivity higher than thermal conductivity of the recording medium and including a heat absorbing portion configured to remove heat from the recording medium, and a contact portion configured to contact airflow produced, as the recording medium rotates, at a position other than a facing surface of a slider opposed to the recording medium and radiate heat.

16 Claims, 14 Drawing Sheets

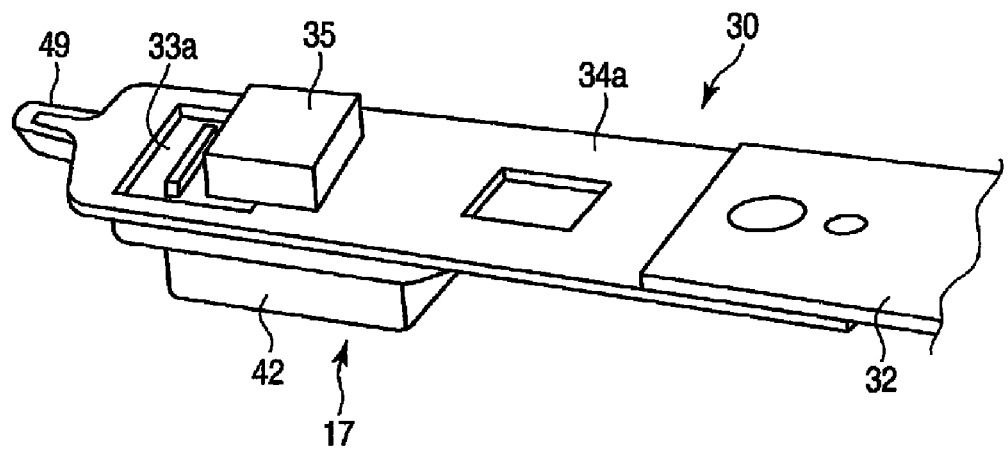
F I G. 2
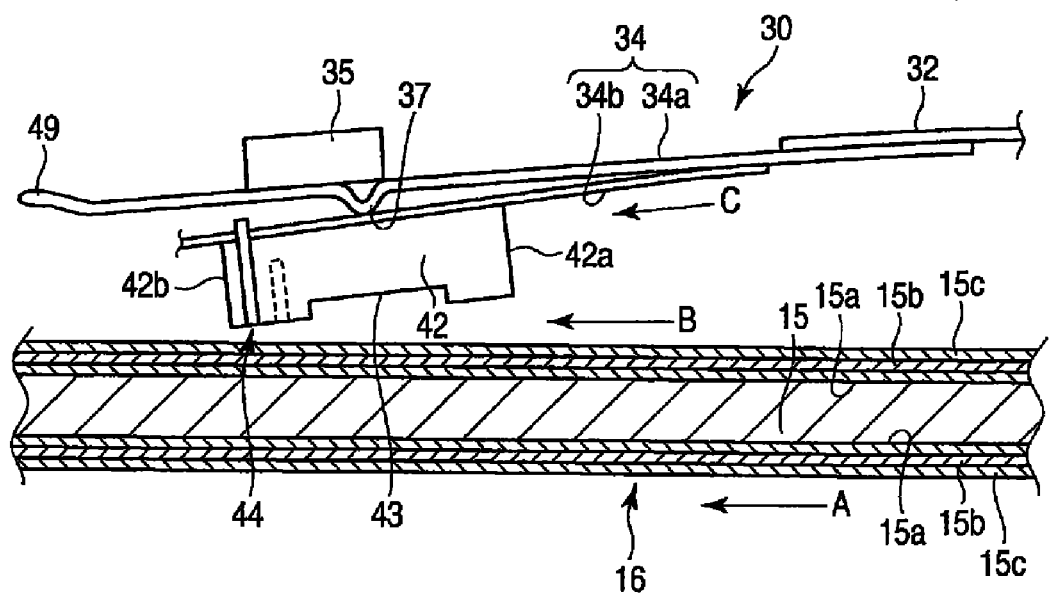
F I G. 3

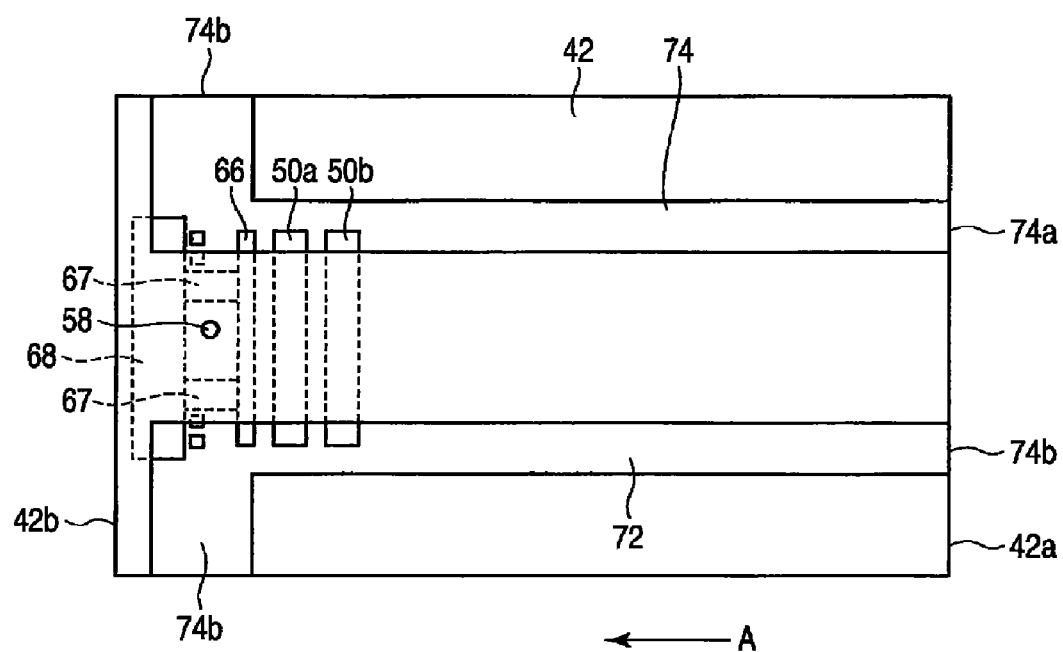
F I G. 11

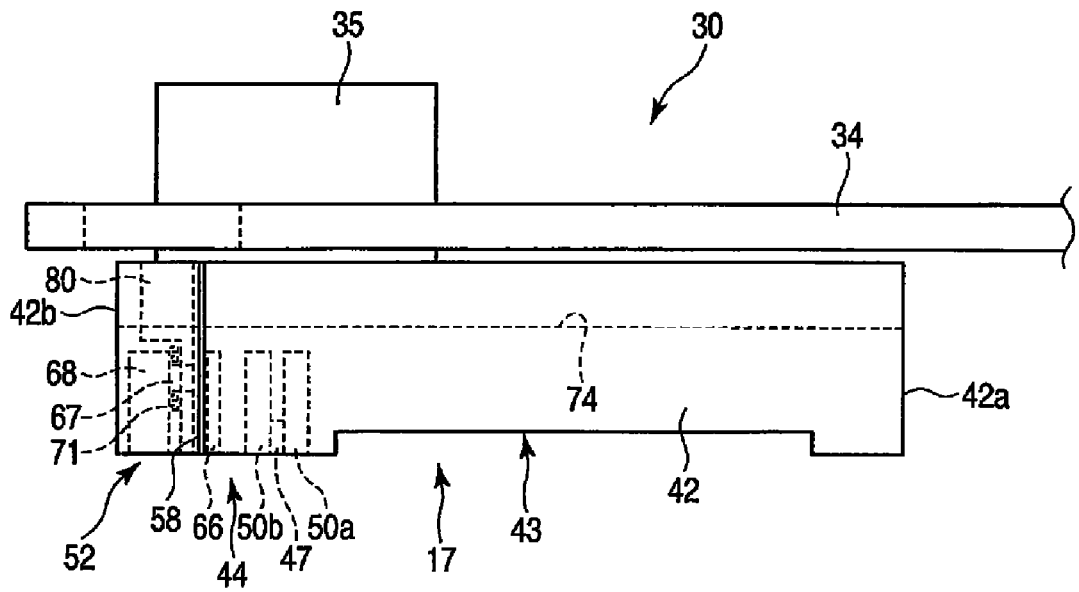
F I G. 14
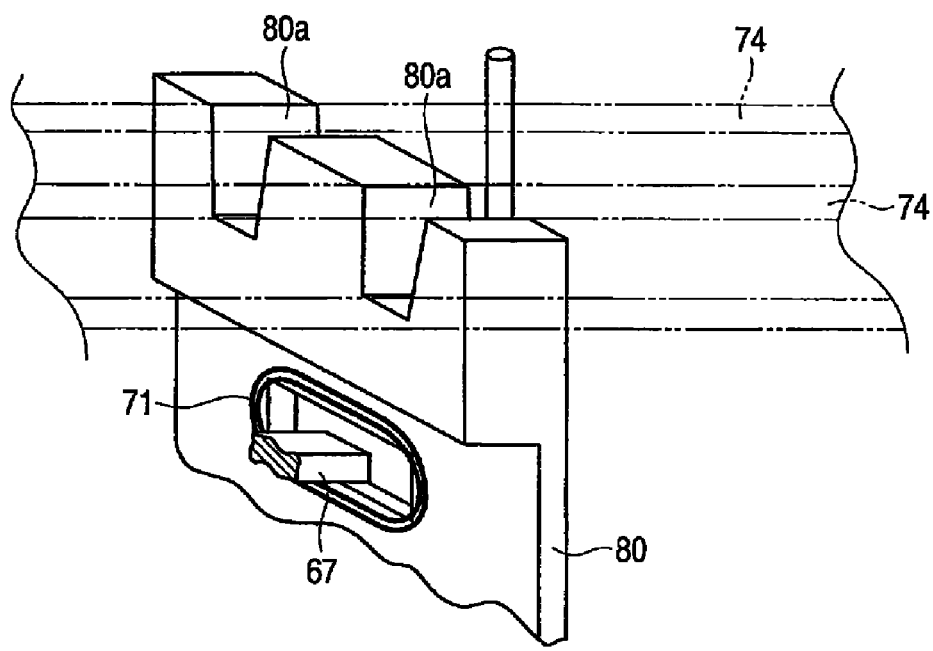
F I G. 15

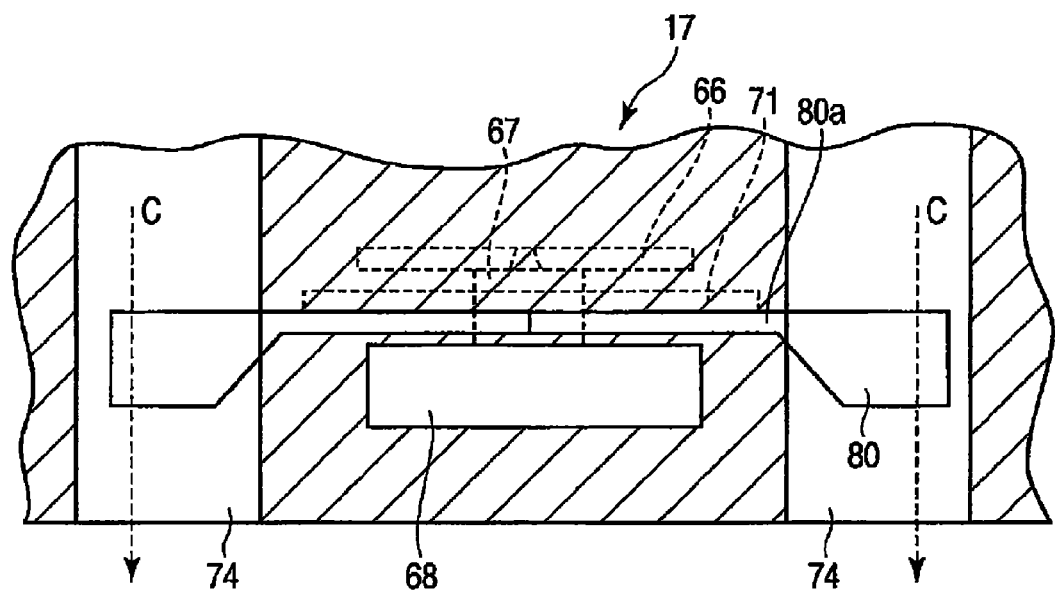
F I G. 18
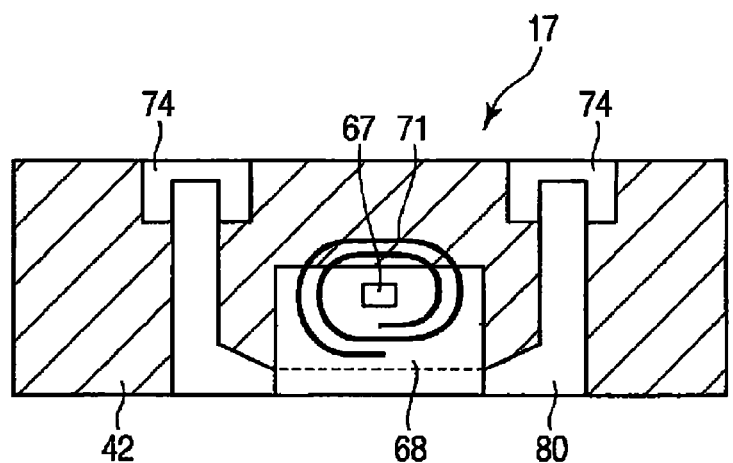
F I G. 19

US 8,203,804 B2

HEAD GIMBAL ASSEMBLY AND DISK DRIVE WITH THE SAME

CROSS-REFERENCE TO RELATED APPLICATIONS

This application is based upon and claims the benefit of priority from Japanese Patent Application No. 2010-231877, filed Oct. 14, 2010; the entire contents of which are incorporated herein by reference.

FIELD

Embodiments described herein relate generally to a head gimbal assembly used in a disk drive and the disk drive provided with the same.

BACKGROUND

In some proposed disk drives, such as magnetic disk drives, a thermally-assisted magnetic recording system is used to achieve improved recording density, lower noise, and high resistance to thermal agitation. In these magnetic disk drives, medium heating means, such as an optical or electron beam, is located near a recording magnetic pole of a magnetic head. In recording operation, a medium is locally heated by the medium heating means so that HcO is reduced to the level of the head magnetic field.

It is important for one such magnetic disk drive to apply a recording magnetic field to the medium, being heated or having just finished being heated, to complete recording before the medium is cooled. It is also important to prevent the recording magnetic field from being inverted by the influence of thermal agitation before the medium is fully cooled.

The thermally-assisted magnetic recording head used in the conventional magnetic disk drive has a problem that the medium cannot be rapidly cooled after thermal laser application, so that recorded data is degraded, and hence, the linear recording density cannot be increased. Further, some heads for photo-magnetic recording comprise an airflow path for cooling a slider. If such magnetic heads are used in a magnetic disk drive, however, their cooling effect is too small to easily suppress degradation of recorded data.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary perspective view showing a head gimbal assembly (HGA) of the HDD comprising a magnetic head and suspension;

FIG. 3 is an exemplary side view of the HGA;

FIG. 11 is an exemplary plan view showing a magnetic head of an HDD according to a fourth embodiment;

FIG. 14 is an exemplary sectional view showing an HGA of an HDD according to a sixth embodiment;

FIG. 15 is an exemplary perspective view schematically showing the HGA of the HDD according to the sixth embodiment;

FIG. 18 is an exemplary sectional view showing a magnetic head of the HDD according to the seventh embodiment; and FIG. 19 is an exemplary sectional view showing the magnetic head of the HDD according to the seventh embodiment.

DETAILED DESCRIPTION

Various embodiments will be described hereinafter with reference to the accompanying drawings.

In general, according to one embodiment, a head gimbal assembly comprises a magnetic head for perpendicular recording, comprising a slider and a head section thereon and configured to record data in a recording medium; a suspension supporting the magnetic head; and a heating module configured to locally heat a recording area of the recording medium. The head section comprises a magnetic core comprising a main pole configured to produce a recording magnetic field, and a return pole opposed to a trailing side of the main pole with a gap to form a magnetic circuit in conjunction with the main pole, a coil configured to excite magnetic flux in the magnetic circuit, and a thermal conductor having thermal conductivity higher than thermal conductivity of the recording medium and comprising a heat absorbing portion configured to oppose the recording medium in the vicinity of the heated region of the recording medium and remove heat from the recording medium, and a contact portion configured to contact airflow produced, as the recording medium rotates, at a position other than a facing surface of the slider opposed to the recording medium and radiate heat.

A first embodiment in which a disk drive is applied to a hard disk drive (HDD) will now be described in detail with reference to the accompanying drawings.

Figure 1:
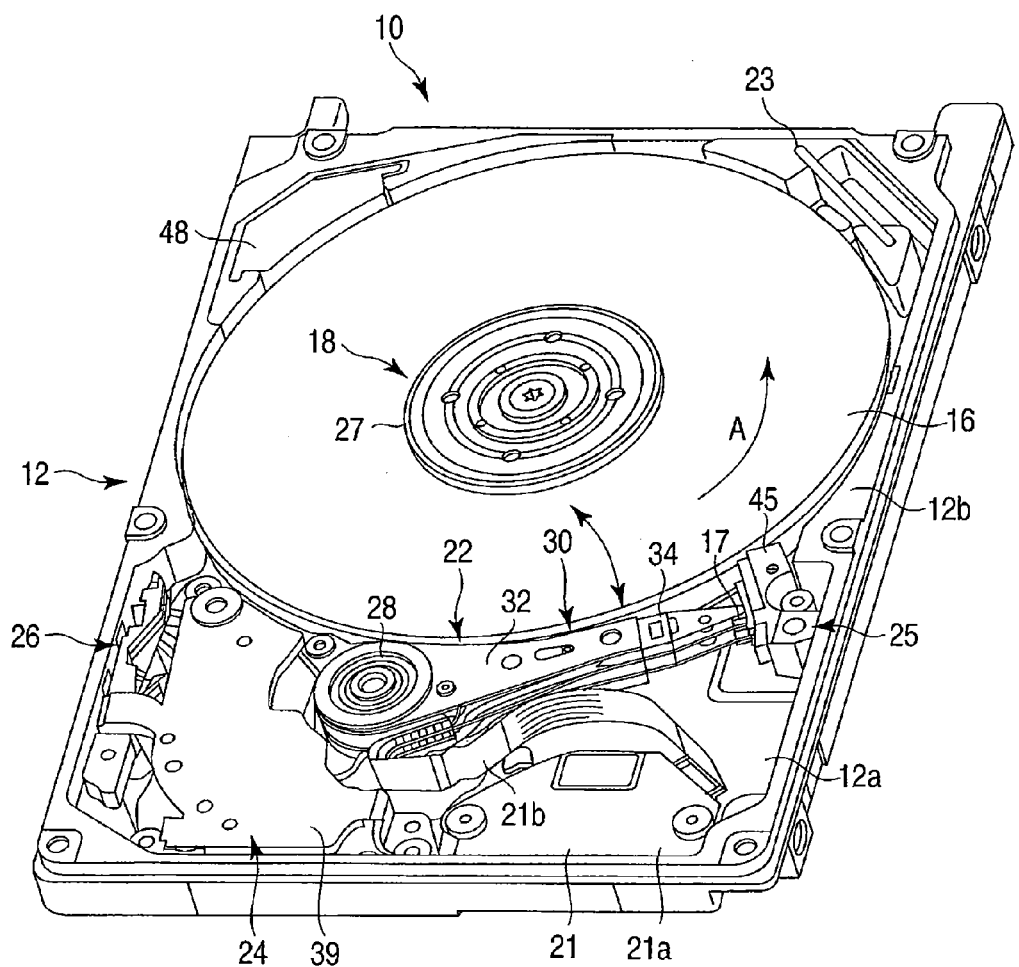
FIG. 1 is an exemplary perspective view showing a hard disk drive (HDD) according to a first embodiment.

FIG. 1 shows the internal structure of the HDD with its top cover removed. FIGS. 2 and 3 show an HGA of the HDD and a flying magnetic head, respectively. As shown in FIG. 1, the HDD comprises a housing 10. The housing 10 comprises a base 12 in the form of an open-topped rectangular box and a top cover (not shown), which is attached to the base by screws so as to close the top opening of the base. The base 12 comprises a rectangular bottom wall 12a and sidewall 12b set up along the peripheral edge of bottom wall.

Two magnetic disks 16 for use as recording media and a mechanical unit are arranged on the base 12. The mechanical unit comprises a spindle motor 18, a plurality (e.g., four) of magnetic heads 17, head stack assembly (HSA) 22, and voice coil motor (VCM) 24. The spindle motor 18 supports and rotates the magnetic disks 16. The magnetic heads 17 record and reproduce data on and from the magnetic disks 16. The HSA 22 supports the heads 17 for movement relative to the disks 16. The VCM 24 pivots and positions the HSA. Further, a ramp loading mechanism 25, latch mechanism 26, and board unit 21 are arranged on the bottom wall 12a. The ramp loading mechanism 25 holds the magnetic heads 17 in an unloaded position off the magnetic disks 16 when the heads are moved to the outermost peripheries of the disks. The latch mechanism 26 holds the HSA 22 in its retracted position if the HDD is, for example, jolted. The board unit 21 comprises a preamplifier and the like.

A printed circuit board (not shown) is attached to the outer surface of the bottom wall 12a of the base 12 by screws. This circuit board controls the operations of the spindle motor 18, VCM 24, and magnetic heads 17 through the board unit 21. A circulatory filter 23 that traps dust produced in the housing 10 as a movable part or parts are operated is disposed on the sidewall of the base 12. The filter 23 is located outside the magnetic disks 16. Further, a breather filter 48 that traps dust in the external air introduced into the housing 10 is disposed on the sidewall of the base 12.

As shown in FIGS. 1 and 3, each magnetic disk 16 is constructed as a double-layered perpendicular medium. Each magnetic disk 16 comprises a substrate 15 formed of a non-magnetic disk with a diameter of, for example, about 2.5 inches. A soft magnetic layer 15a called a soft magnetic underlayer is formed on each surface of the substrate 15. The soft magnetic layer 15b is overlain by a perpendicular magnetic recording layer 15b, which has a magnetic anisotropy (easy axis) substantially perpendicular to the disk surface. Further, a protective film 15c is formed on the recording layer 15b.

As shown in FIG. 1, the magnetic disks 16 are coaxially fitted on a hub of the spindle motor 18 and clamped and secured to the hub by a clamp spring 27, which is attached to the upper end of the hub by screws. The disks 16 are rotated in the direction of arrow A at a predetermined speed, e.g., 5,400 or 7,200 rpm, by the spindle motor 18.

As shown in FIG. 1, the HSA 22 comprises a rotatable bearing unit 28 and a plurality of stack members mounted in layers on the bearing unit 28. The stack members include four head gimbal assemblies (HGAs) 30 and two spacer rings sandwiched between the HGAs.

The bearing unit 28 is located at a distance from the center of rotation of the magnetic disks 16 longitudinally relative to the base 12 and near the outer peripheral edges of the disks 16. The bearing unit 28 comprises a pivot set up on the bottom wall 12a of the base 12 and a cylindrical sleeve rotatably supported on the pivot by bearings.

As shown in FIGS. 1, 2, and 3, each HGA 30 comprises an arm 32 extending from the bearing unit 28, a suspension 34 extending from the arm, and one of the magnetic heads 17 supported on the extended end of the suspension by a gimbal. Further, each HGA 30 comprises a laser light source 35 for use as a heating unit, which applies a laser beam to the perpendicular magnetic recording layer 15b of each magnetic disk 16, thereby locally heating it. The laser light source 35 is mounted on, for example, the distal end portion of the suspension 34.

The arm 32 is a thin flat plate formed by laminating, for example, stainless-steel, aluminum, and stainless-steel sheets. A circular through-hole is formed in one end or proximal end of the arm 32. The suspension 34 comprises a load beam 34a in the form of an elongated plate spring and a gimbal 34b (described later) mounted on the load beam. The suspension 34 has its proximal end secured to the distal end of the arm 32 by spot welding or adhesive bonding and extends from the arm. The suspension 34 and arm 32 may be integrally formed from the same material. The HGA 30 may be a concept that does not include an arm.

A flexure for use as a conductor trace is mounted on the arm 32 and load beam 34a. The magnetic head 17 is electrically connected to a main FPC 21b (described later) through this flexure.

As shown in FIG. 1, the four HGAs 30 and spacer rings are fitted on the sleeve of the bearing unit 28 that is passed through the respective through-holes of the arms 32 and spacer rings, and are laminated along the axis of the sleeve. The four arms 32 are located parallel to one another with predetermined spaces therebetween and extend in the same direction from the bearing unit 28. The HSA 22 comprises a support frame (not shown) extending from the bearing unit 28 on the opposite side to the arms 32. A voice coil 41 that constitutes a part of the VCM 24 is embedded in the support frame.

With the HSA 22 incorporated on the base 12, the bearing unit 28 has the lower end portion of its pivot secured to the base 12 and stands substantially parallel to the spindle of the spindle motor 18. Each magnetic disk 16 is located between its corresponding two of the HGAs 30. When the HDD is active, the magnetic heads 17 on the arms 32 face the top and bottom surfaces, individually, of the magnetic disk 16 and hold the disk from both sides. The voice coil 41 secured to the support frame is located between a pair of yokes secured to the base 12. Thus, the voice coil, along with the yokes and a magnet (not shown) secured to one of the yokes, constitutes the VCM 24.

If the voice coil of the VCM 24 is energized with the magnetic disks 16 rotating, the HSA 22 pivots, whereupon each magnetic head 17 is moved to and positioned on a desired track of the corresponding disk 16. When this is done, the head 17 is moved radially relative to the disk 16 between the inner and outer peripheral edges of the disk.

As shown in FIG. 1, the board unit 21 comprises a main body 21a formed of a flexible printed circuit board, which is secured to the bottom wall 12a of the base 12. Electronic components (not shown), including a head amplifier, are mounted on the main body 21a. A connector (not shown) for connection with the printed circuit board is mounted on the bottom surface of the main body 21a.

The board unit 21 comprises the main flexible printed circuit board (main FPC) 21b extending from the main body 21a. An extended end of the main FPC 21b is secured to the vicinity of the bearing unit 28. The flexure of each HGA 30 is mechanically and electrically connected to a connecting end portion of the main FPC 21b. Thus, the board unit 21 is electrically connected to each magnetic head 17 through the main FPC 21b and flexure.

As shown in FIG. 1, the ramp loading mechanism 25 comprises a ramp 45 and tabs 49 (FIGS. 2 and 3). The ramp 45 is disposed on the bottom wall 12a of the base 12 and located outside the magnetic disks 16. The tabs 49 extend individually from the respective distal ends of the suspensions 34. When the HSA 22 pivots around the bearing unit 28 so that the magnetic heads 17 move to their retracted position outside the disks 16, each of the tabs 49 engages with a ramp surface formed on the ramp 45 and is then pushed up the ramp surface. Thereupon, the heads 17 are unloaded from the disks 16 and held in the retracted position.

The HGA 30 and magnetic heads 17 will now be described in detail. As shown in FIGS. 2 and 3, the gimbal 34b is mounted on the disk-facing side of the load beam 34a. The gimbal 34b is, for example, an elongated thin band of stainless steel. The gimbal 34b comprises a flat head mounting portion and band-like fixed portion. The fixed portion extends from the head mounting portion toward the proximal end of the arm. The mounting portion faces the distal end portion of the load beam 34a with a gap therebetween and is located so that its central axis is substantially aligned with that of the load beam 34a. The fixed portion is secured to the load beam 34a by, for example, spot welding.

The magnetic head 17 is mounted on the head mounting portion of the gimbal 34b. Each magnetic head 17 comprises a substantially rectangular slider 42 and head section 44 formed on the slider. The head section 44 comprises, for example, a recording element and magnetoresistive (MR) element for reproduction. The slider 42 has a size corresponding to the mounting portion of the gimbal 34b and its backside is secured to the mounting portion by, for example, adhesive bonding.

As shown in FIG. 2, a dimple or substantially hemispheric protrusion 37, projecting on the magnetic head side in this case, is formed at that position on the load beam 34a which faces the head mounting portion of the gimbal 34b, that is, the central portion of the magnetic head 17. The protrusion 37 abuts the mounting portion from behind the head 17. The head mounting portion is elastically pressed against the protrusion 37 by the elasticity of the gimbal 34b. The magnetic head 17 and the head mounting portion of the gimbal 34b can be displaced in the pitch and roll directions or vertically around the protrusion 37 by elastic deformation of the gimbal. Further, the magnetic head 17 is subjected to a predetermined head load produced by the spring force of the suspension 34 and directed to the surface of the magnetic disk 16.

Figure 4:
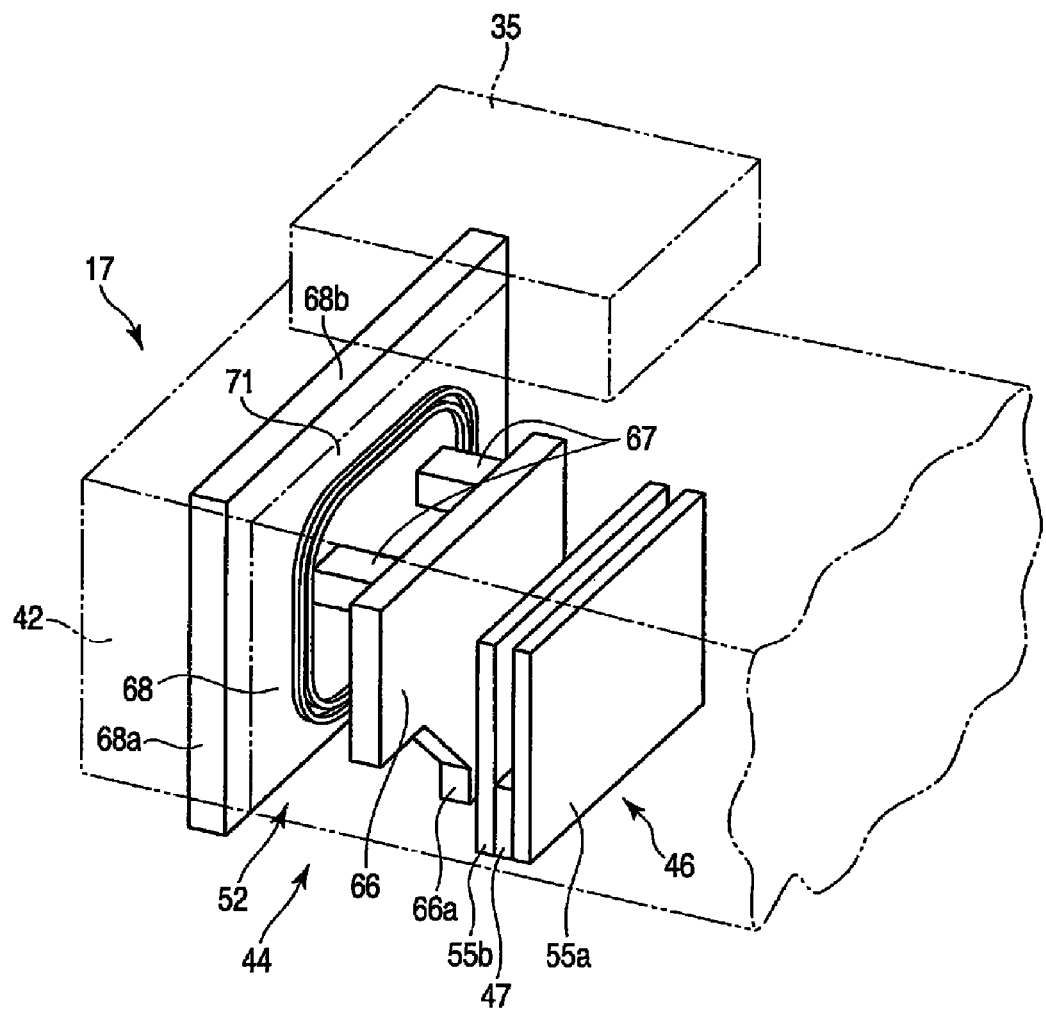
FIG. 4 is an exemplary perspective view schematically showing the magnetic head and a laser light source.
Figure 5:
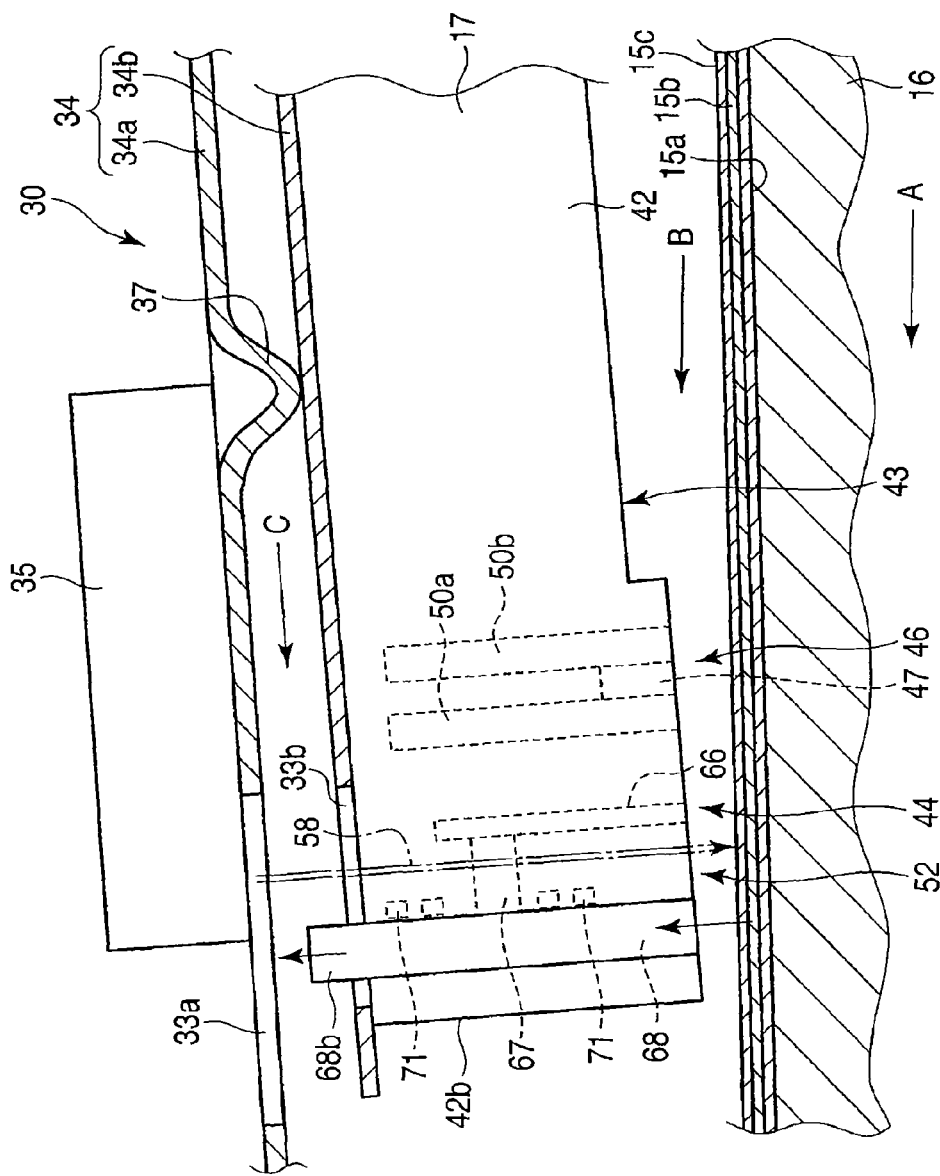
FIG. 5 is an exemplary enlarged sectional view showing the magnetic head.

FIG. 4 schematically shows the head section 44 of the magnetic head 17, and FIG. 5 is an enlarged sectional view showing the head section.

As shown in FIGS. 2 to 5, each magnetic head 17 is constructed as a flying head, which comprises the substantially cuboid slider 42 and head section 44 formed on the outlet or trailing end portion of the slider. The slider 42 is formed of, for example, a sintered body (AlTic) containing alumina and titanium carbide, and the head section 44 is formed by laminating thin films.

The slider 42 has a rectangular disk-facing surface or air-bearing surface (ABS) 43 configured to face a surface of the magnetic disk 16. The slider 42 is caused to fly by airflow B that is produced between the disk surface and the ABS 43 as the magnetic disk 16 rotates. The direction of airflow C is coincident with a direction of rotation A of the disk 16. The slider 42 is located on the surface of the disk 16 in such a manner that the longitudinal direction of the ABS 43 is substantially coincident with the direction of airflow B.

The slider 42 comprises leading and trailing ends 42a and 42b on the inlet and outlet sides, respectively, of airflow B. The ABS 43 of the slider 42 is formed with leading and trailing steps, side steps, negative-pressure cavity, etc., which are not shown.

As shown in FIGS. 3 to 5, the head section 44 is formed as a dual-element magnetic head, comprising a reproduction head 46 and recording head 52 formed on the trailing end 42b of the slider 42 by thin-film processing.

The reproduction head 46 comprises a magnetic film 47 having a magnetoresistive effect and shielding films 50a and 50b located on the trailing and leading sides, respectively, of the magnetic film 47 so as to sandwich the magnetic film between them. The respective lower ends of the magnetic film 47 and shielding films 50a and 50b are exposed in the ABS 43 of the slider 42.

The recording head 52 is located nearer to the trailing end 42b of the slider 42 than the reproduction head 46. The recording head 52 comprises a magnetic core and recording coil 71. The magnetic core comprises a main pole 66, return pole 68, and a pair of junctions 67. The main pole 66 is formed from a high-permeability material and produces a recording magnetic field perpendicular to the surfaces of the magnetic disk 16. The return pole 68 is located on the trailing side of the main pole 66, that is, downstream relative to the travel of the head, and serves to efficiently return magnetic flux from the main pole through the soft magnetic layer 15a just below the main pole, thereby forming a magnetic circuit in conjunction with the main pole. The junctions 67 connect respective upper parts of the main and return poles 66 and 68. The recording coil 71 is located so as to wind around a magnetic path including the main and return poles 66 and 68 to pass magnetic flux to the main pole 66 while a signal is being written to the magnetic disk 16. A current supplied to the recording coil 71 is controlled by a control unit of the HDD.

The slider 42 is formed with a laser introduction path 58 through which a laser beam emitted from the laser light source 35 is guided to the magnetic disk 16 in the vicinity of the main pole 66. In this arrangement, the laser introduction path 58 extends between the main and return poles 66 and 68.

The main pole 66 extends substantially at right angles to the surfaces of the magnetic disk 16. A distal end portion 66a of the main pole 66 on the disk side is tapered toward the disk surface. The distal end portion 66a of the main pole 66 has, for example, a trapezoidal cross-section and comprises a trailing-side end with a predetermined width on the trailing end side. The distal end surface of the main pole 66 is exposed in the ABS 43 of the slider 42. The width of the trailing-side end of the distal end portion 66a is substantially equal to the track width of the magnetic disk 16.

The return pole 68 extends substantially at right angles to the surfaces of the magnetic disk 16, and its distal end portion has an elongated rectangular shape. The distal or lower end surface of the return pole 68 is exposed in the ABS 43 of the slider 42. The leading-side end surface of the distal end portion is opposed parallel to the trailing-side end of the main pole 66 with a write gap therebetween. As described later, the distal end portion of the return pole 68 constitutes a heat absorbing portion that removes heat from the magnetic disk 16. The upper end portion of the return pole 68 constitutes a projecting portion 68b that projects upward beyond the back of the slider 42. The opposite side portions of the return pole 68 individually project sideways from the opposite side surfaces of the slider 42 and constitute projecting portions 68a. According to the present embodiment, the return pole 68, including the projecting portions 68a and 68b, is formed from a highly conductive high-permeability material more electrically conductive than the magnetic disk 16 and constitutes a thermal conductor. The projecting portions 68a and 68b constitute that contact portion of slider 42 other than the ABS which contacts airflow.

Thus, the return pole 68, which is more conductive than the magnetic disk 16, is located on the trailing side of the main pole 66. Moreover, the projecting portion 68b of the return pole projects upward from the back of the slider 42 and is located in a space between the gimbal 34b and load beam 34a. As shown in FIG. 5, openings 33a and 33b are formed opposite the projecting portion 68b in the gimbal 34b and load beam 34a, individually. As the magnetic disk 16 rotates when the magnetic disk drive is actuated, airflow C that passes from the inlet side of the slider 42 to the outlet side is produced between the slider 42 and load beam 34a and above the load beam. Thus, the projecting portion 68b is in contact with an air passage 70 through which airflow C passes.

As shown in FIG. 5, a protection insulating film entirely covers the reproduction head 46 and recording head 52 except for those parts which are exposed in the ABS 43 of the slider 42. The protective insulating film 82 defines the contour of the head section 44.

When the VCM 24 is activated, according to the HDD constructed in this manner, the HSA 22 pivots, whereupon each magnetic head 17 is moved to and positioned on a desired track of the magnetic disk 16. Further, the magnetic head 17 is caused to fly by airflow B that is produced between the disk surface and the ABS 43 as the magnetic disk 16 rotates. When the HDD is operating, the ABS 43 of the slider 42 is opposed to the disk surface with a gap therebetween. As shown in FIG. 3, the magnetic head 17 is caused to fly with the trailing end portion of the head section 44 inclined to be closest to the surface of the disk 16. In this state, the reproduction head 46 reads recorded data from the disk 16, while the recording head 52 writes data to the disk.

In writing data, a laser beam is emitted from the laser light source 35 to a desired recording position on the magnetic disk 16 through the laser introduction path 58 of the slider 42, whereupon the perpendicular magnetic recording layer 15b of the disk is locally heated. In this state, the recording coil 71 excites the main pole 66, which applies a perpendicular recording magnetic field to the recording layer 15b of the magnetic disk 16 just below the main pole, thereby recording data with a desired track width in the heated region. The magnetic field applied from the main pole 66 to the recording layer 15b propagates along the surface through the soft magnetic layer 15a and then gradually returns to the return pole.

After the writing, the highly conductive return pole 68 removes heat from the heated region of the magnetic disk 16, thereby rapidly cooling the heated region. When this is done, the projecting portion 68b of the return pole 68 contacts airflow C passing through the air passage 70 and radiates heat. In this way, the return pole 68 can be cooled to become less hot than other parts of the magnetic head 17. Thus, the return pole 68 can efficiently remove heat from the heated region of the magnetic disk 16, thereby rapidly cooling the heated region.

FIGS. 6A, 6B, 6C and 7 comparatively illustrate the functions and effects of the HDD according to the first embodiment and an HDD according to a comparative example. In the HDD according to the comparative example, a magnetic head does not comprise a thermal conductor located downstream relative to a main pole, that is, on the trailing end side.

Figure 6A:
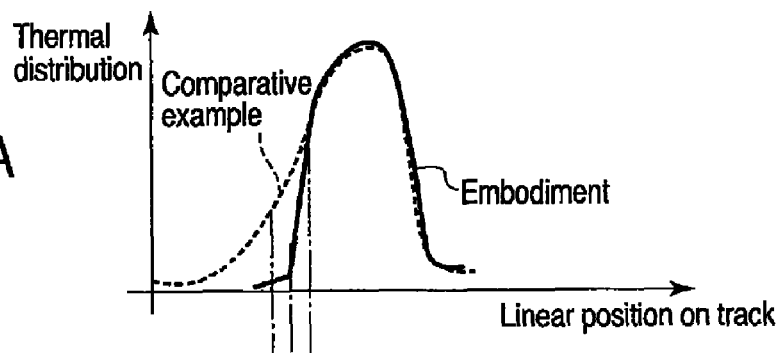
FIGS. 6A, 6B and 6C are exemplary diagrams comparatively illustrating the functions and effects of the HDD according to the first embodiment and an HDD according to a comparative example.
Figure 6B:
Figure 6C:
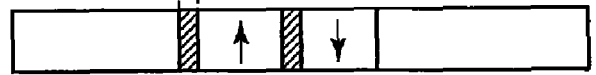
Figure 7:
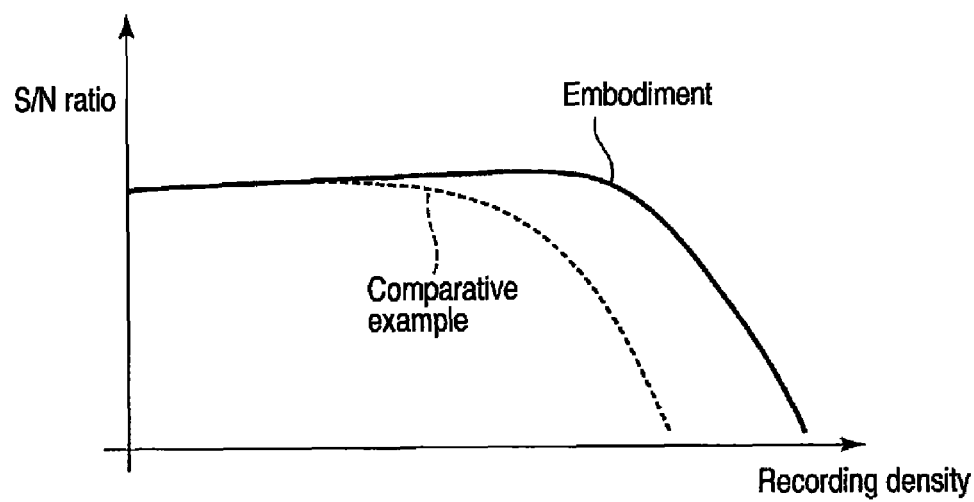
FIG. 7 is an exemplary diagram comparatively illustrating the recording densities and signal-to-noise ratios of the HDDs according to the first embodiment and comparative example.

Since the magnetic head of the comparative example has a small thermal diffusion effect, as shown in FIGS. 6A and 6B, a gentle thermal gradient is produced on the trailing end side after the laser application, so that recorded data is inevitably degraded. In the magnetic head of the HDD according to the present embodiment, in contrast, airflow passes between the slider and magnetic disk and above the slider as the magnetic disk 16 rotates. Since the return pole 68 comprises the projecting portion 68b, it is cooled by airflow C above the slider, so that it becomes less hot than the magnetic disk 16. In this case, thermal equilibrium is approached, and heat moves from the magnetic disk 16 toward the return pole 68. Thus, according to the present embodiment, as shown in FIGS. 6B and 6C, heat can be rapidly diffused at the trailing end portion after the laser application, so that the thermal gradient becomes sharp. Therefore, the recorded data cannot be degraded, so that a high signal-to-noise ratio can be maintained. Consequently, according to the present embodiment, the recording density can be improved compared with the comparative example, as shown in FIG. 7.

Accordingly, there may be obtained a head gimbal assembly and a disk drive provided with the same, in which degradation of recorded data can be suppressed and the linear recording density can be improved.

The following is a description of HDDs according to alternative embodiments.

Figure 8:
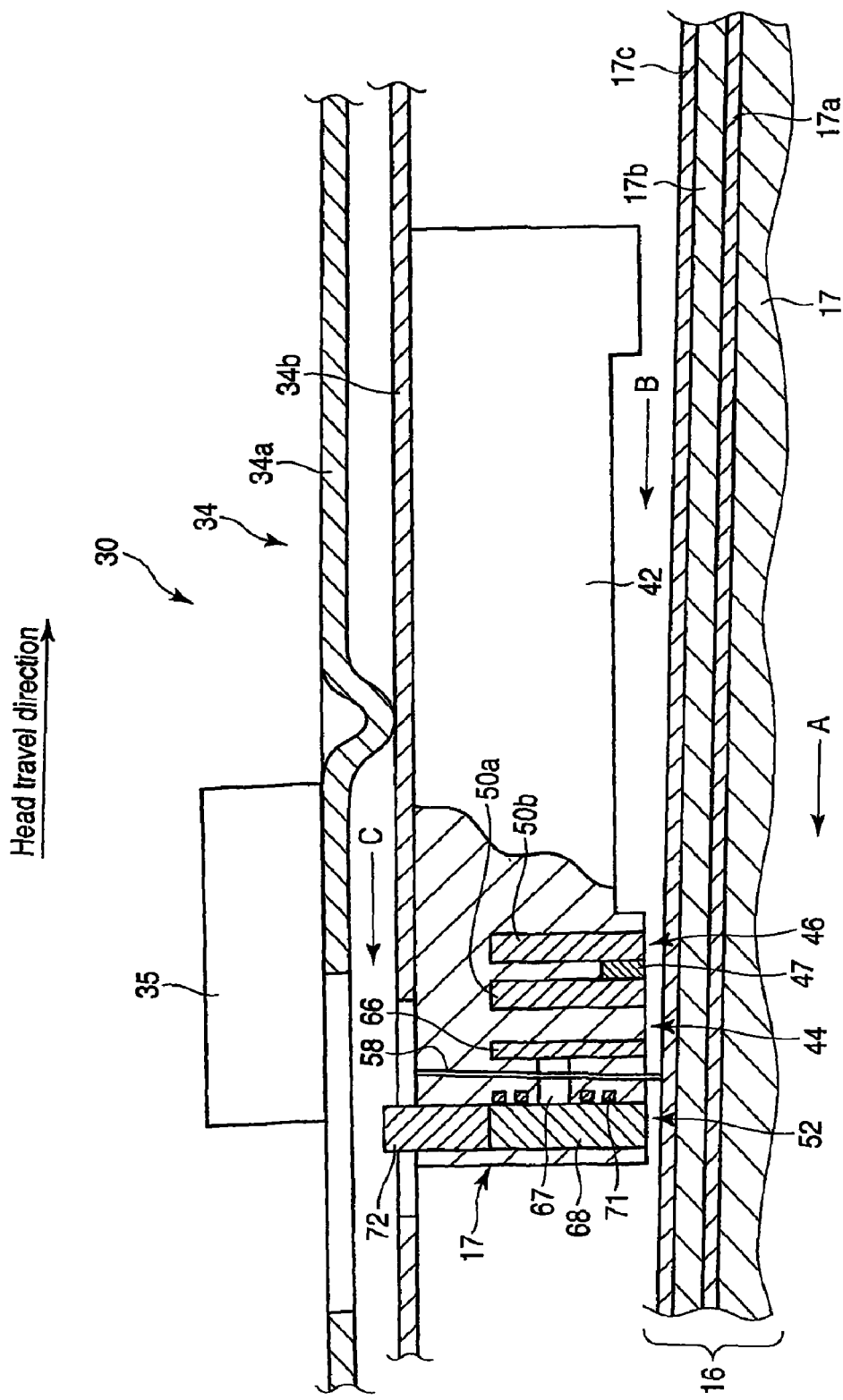
FIG. 8 is an exemplary sectional view showing an HGA of an HDD according to a second embodiment.

FIG. 8 shows an HGA 30 of an HDD according to a second embodiment. According to the second embodiment, a recording head 52 of a magnetic head 17 comprises main and return poles 66 and 68 of a high-permeability material, projecting portion 72 of a high electrical conductor, a pair of junctions 67, and recording coil 71. The return pole 68 is located on the trailing side of the main pole 66 and serves to efficiently close a magnetic path. The projecting portion 72 projects upward from the back of a slider 42, which is joined to the return pole 68. The junctions 67 connect the main and return poles 66 and 68. The recording coil 71 is located so as to wind around the magnetic path including the main and return poles 66 and 68 to pass magnetic flux to the main pole 66 while a signal is being written to a magnetic disk 16. The slider 42 is formed with a laser introduction path 58 through which a laser beam emitted from a laser light source 35 is guided to the magnetic disk 16 in the vicinity of the main pole 66. In this arrangement, the laser introduction path 58 extends between the main and return poles 66 and 68.

The projecting portion 72 is formed from a highly conductive high-permeability material more electrically conductive than the magnetic disk 16 and constitutes a thermal conductor. The projecting portion 72, which functions as a contact portion, is located in a space between a gimbal 34b and load beam 34a. As the magnetic disk 16 rotates when the magnetic disk drive is actuated, airflow C that passes from the inlet side of the slider 42 to the outlet side is produced between the slider 42 and load beam 34a and above the load beam. Thus, the projecting portion 72 is in contact with an air passage through which airflow C passes.

Since other configurations of the HDD of the second embodiment are the same as those of the first embodiment, like reference numbers are used to designate like parts in the first and second embodiments, and a detailed description of those parts is omitted. The same functions and effects as those of the first embodiment can also be obtained from the second embodiment.

Figure 9:
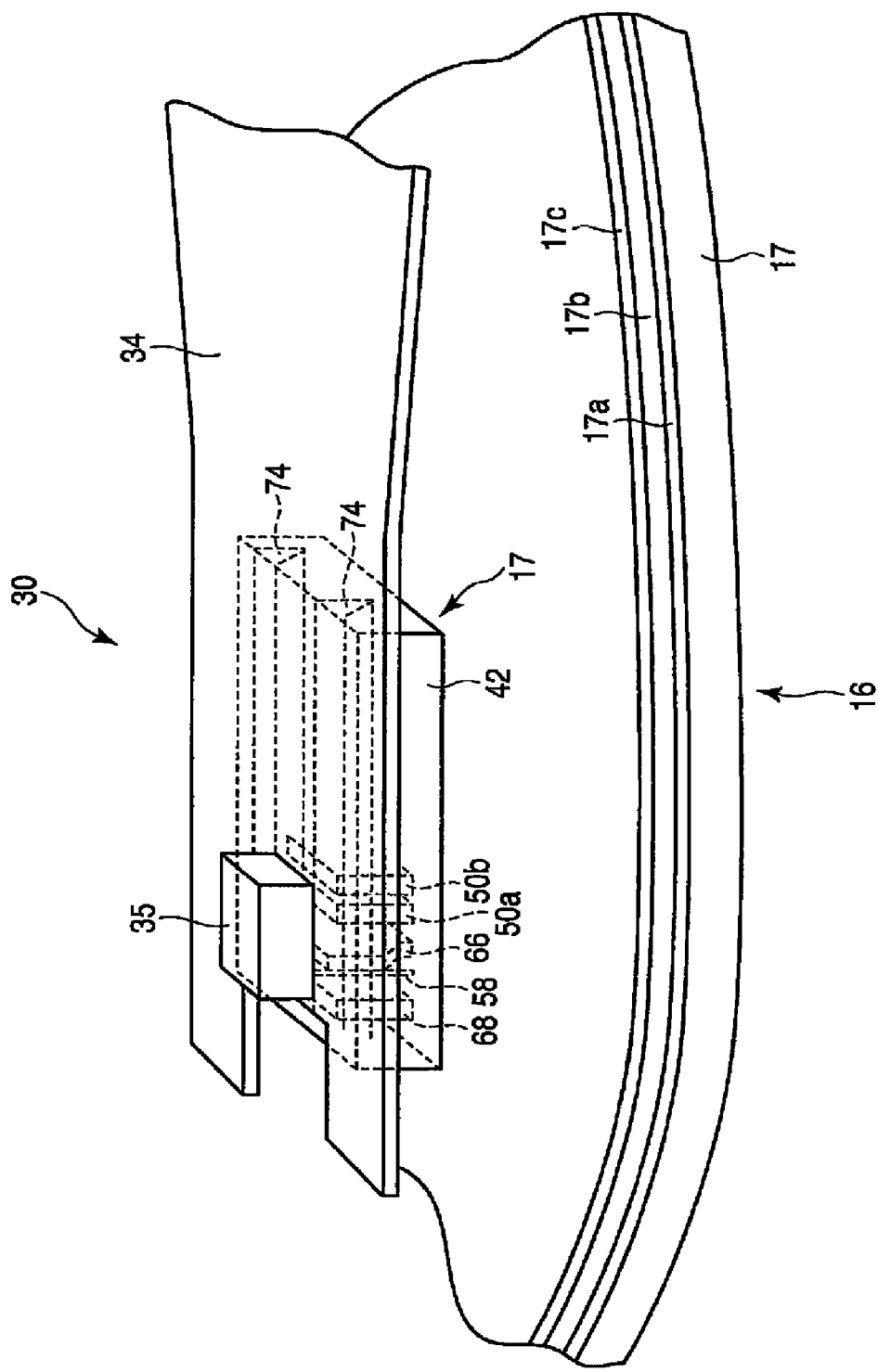
FIG. 9 is an exemplary perspective view showing an HGA of an HDD according to a third embodiment.
Figure 10:
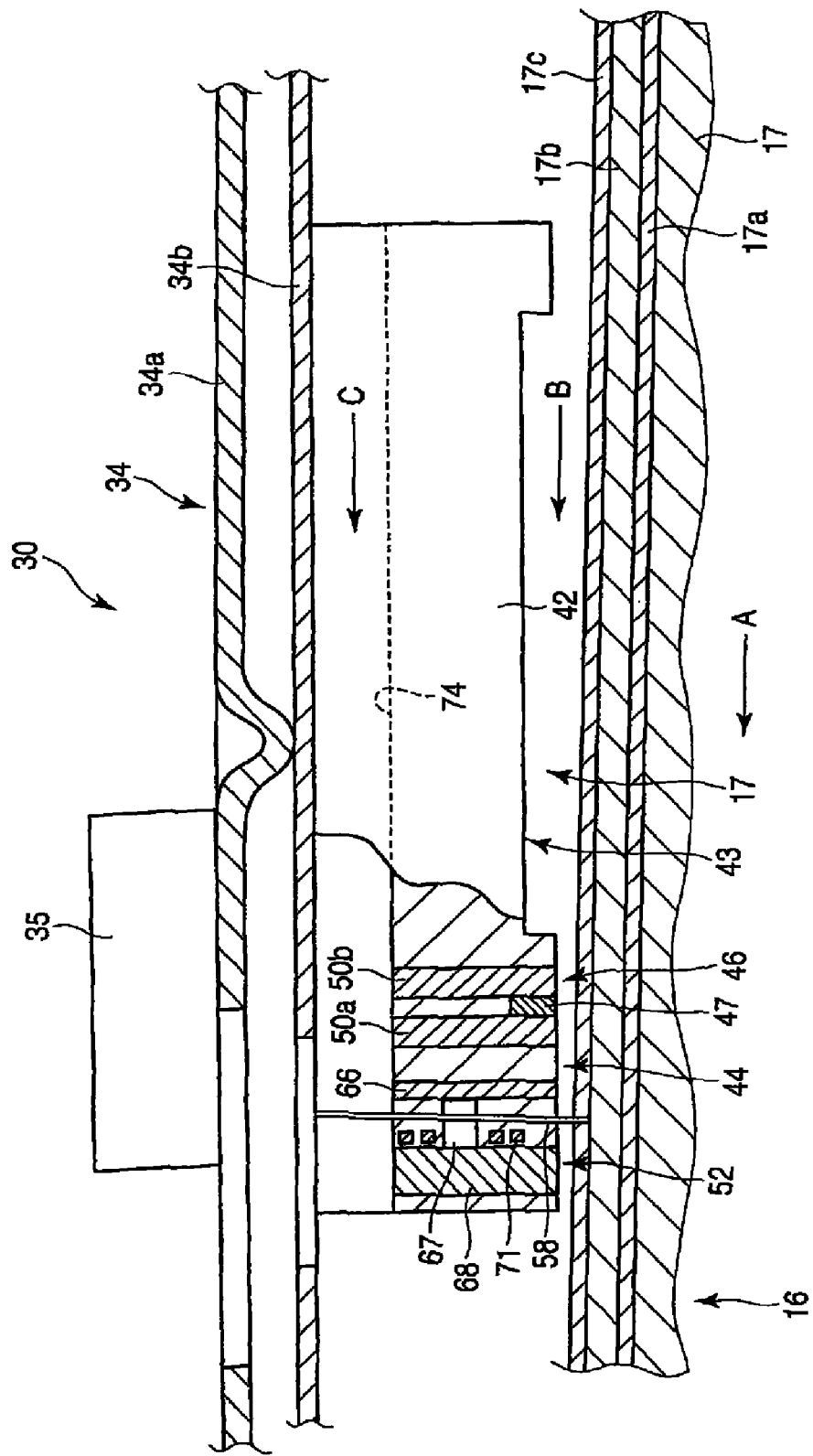
FIG. 10 is an exemplary sectional view showing the HGA of the HDD according to the third embodiment.

FIGS. 9 and 10 show an HGA 30 of an HDD according a third embodiment. According to the third embodiment, a magnetic head 17 is constructed as a dual-element magnetic head comprising separate recording and reproduction heads 52 and 46. The recording head 52 comprises a magnetic core and recording coil 71. The magnetic core comprises main and return poles 66 and 68 of a high-permeability material and a pair of junctions 67. The return pole 68 is located on the trailing side of the main pole 66 and serves to efficiently close a magnetic path. The junctions 67 connect the main and return poles 66 and 68. The recording coil 71 is located so as to wind around the magnetic path including the main and return poles 66 and 68 to pass magnetic flux to the main pole 66 while a signal is being written to a magnetic disk 16. The respective lower ends of the main and return poles 66 and 68 are exposed in an ABS 43 of a slider 42. The slider 42 is formed with a laser introduction path 58 through which a laser beam emitted from a laser light source 35 is guided to the magnetic disk 16 in the vicinity of the main pole 66. In this arrangement, the laser introduction path 58 extends between the main and return poles 66 and 68.

The reproduction head 46 comprises a magnetic film 47 having a magnetoresistive effect and shielding films 50a and 50b located on the trailing and leading sides, respectively, of the magnetic film 47 so as to sandwich the magnetic film between them. The respective lower ends of the magnetic film 47 and shielding films 50a and 50b are exposed in the ABS 43 of the slider 42.

A plurality (e.g., two) of distribution grooves 74, which individually extend from the inlet side of the slider 42 to the outlet side, are formed in the back or top surface of the slider 42 that contacts a gimbal 34b. The respective upper end portions of the return and main poles 68 and 66, which function as thermal conductors, and those of the reproduction shields 50a and 50b individually contact the distribution grooves 74 and constitute a contact portion.

As the magnetic disk 16 rotates, airflow that passes through the distribution grooves 74 is produced and used to cool the return pole 68, main pole 66, and reproduction shields 50a and 50b. Thus, the return pole 68, main pole 66, and reproduction shields 50a and 50b can always be kept at a temperature lower than that of the disk 16. Since the disk 16 is located at a distance of 10 nm or less from the magnetic head 17, its thermal conductivity is so high that thermal diffusion is caused to produce thermal conduction from the disk 16 toward the return or main pole 68 or 66 or reproduction shields 50a and 50b. Thus, the heated region of the magnetic disk 16 heated by the laser beam can be rapidly cooled by the return and main poles 68 and 66. A thermal transfer layer of a material with high thermal conductivity, e.g., copper, may be formed on the inner surface of each distribution groove 74. The cooling efficiency can be further improved by doing this. Further, the number of distribution grooves is not limited to two and may be one or three or more.

Since other configurations of the HDD of the third embodiment are the same as those of the first embodiment, like reference numbers are used to designate like parts in the first and third embodiments, and a detailed description of those parts is omitted. The same functions and effects as those of the first embodiment can also be obtained from the third embodiment.

Each distribution groove 74 of the slider 42 is not limited to the configuration in which it extends from the inlet end of the slider to the outlet end. As in a fourth embodiment shown in FIG. 11, each distribution groove 74 may be configured to extend from an inlet end 42a of a slider 42 to a return pole 68 and then open in a side surface of the slider 42. Specifically, each distribution groove 74 has an inlet end 74a opening in the inlet end 42a of the slider 42 and an outlet end 74b opening in a side surface of the slider. The same functions and effects as those of the first embodiment can also be obtained from this arrangement.

Figure 12:
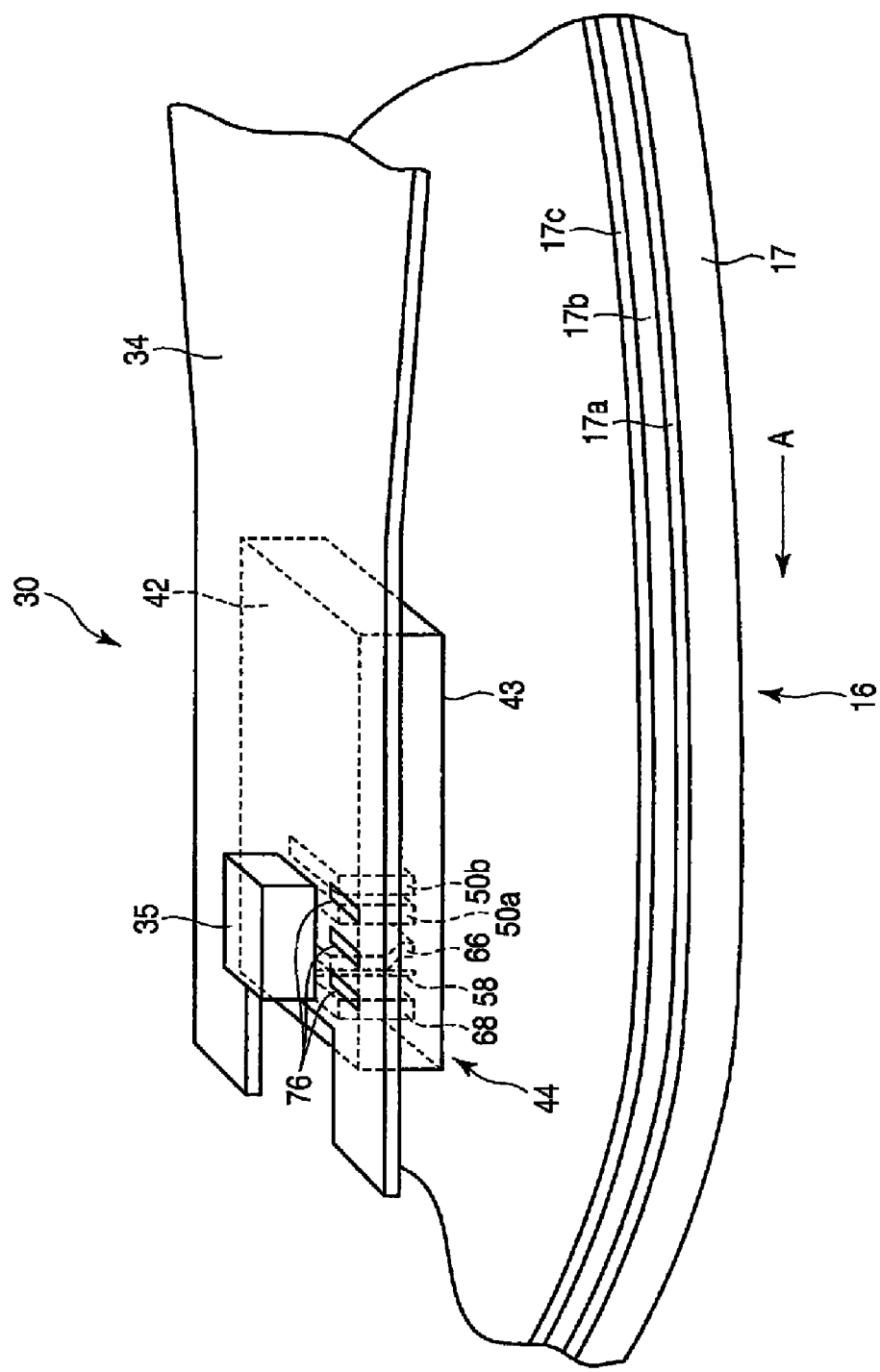
FIG. 12 is an exemplary perspective view showing an HGA of an HDD according to a fifth embodiment.
Figure 13:
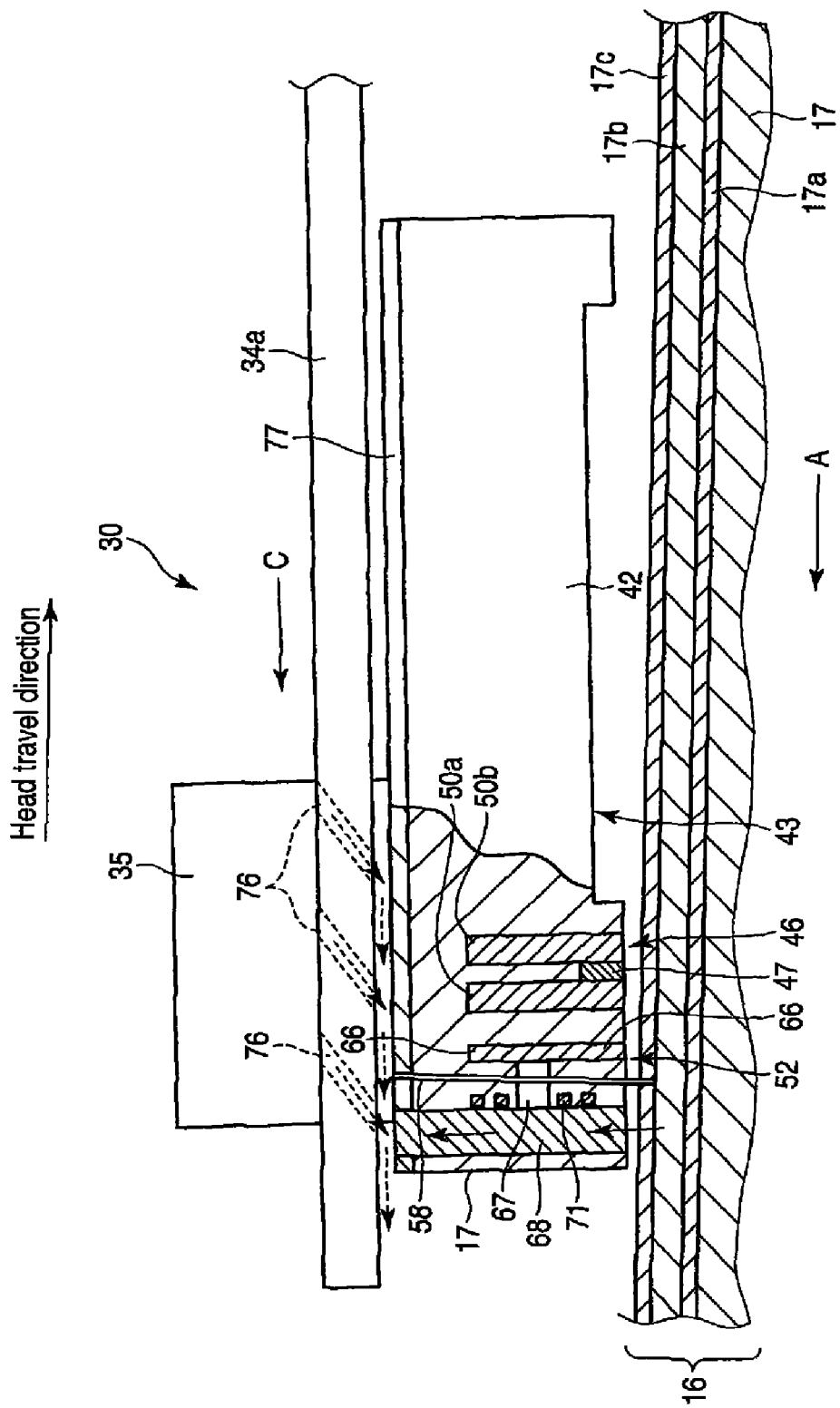
FIG. 13 is an exemplary sectional view showing the HGA of the HDD according to the fifth embodiment.
Figure 16:
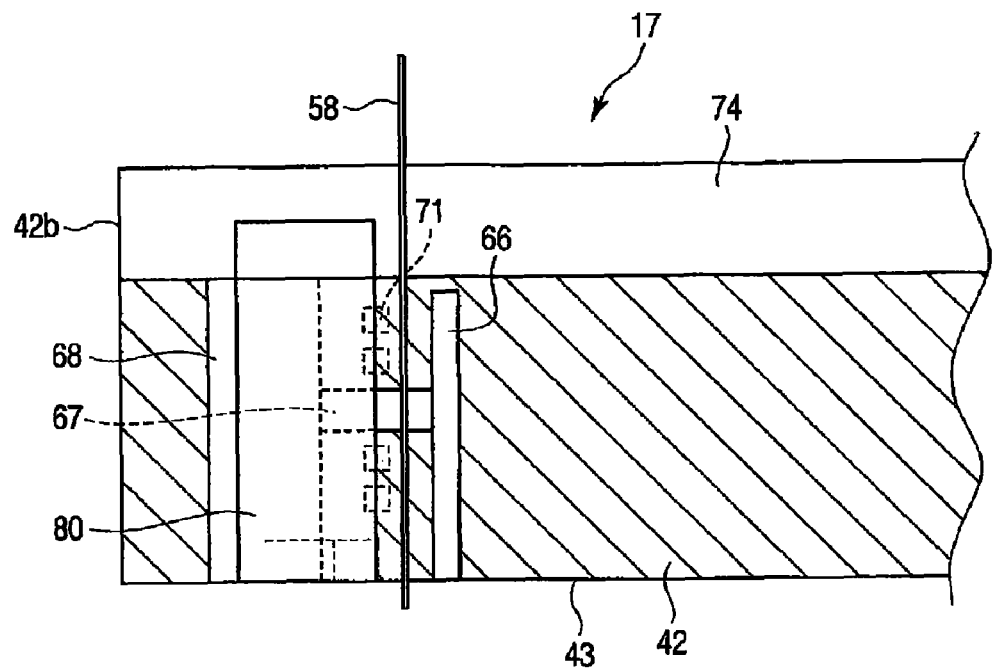
FIG. 16 is an exemplary sectional view showing an HGA of an HDD according to a seventh embodiment.
Figure 17:
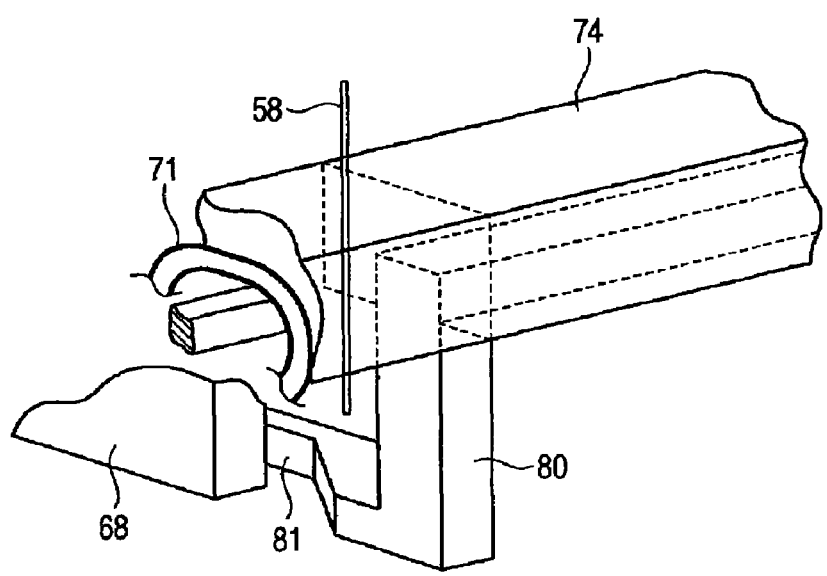
FIG. 17 is an exemplary perspective view schematically showing the HGA of the HDD according to the seventh embodiment.

FIGS. 12 and 13 show an HGA 30 of an HDD according a fifth embodiment. According to the fifth embodiment, a magnetic head 17 is constructed as a dual-element magnetic head comprising separate recording and reproduction heads 52 and 46. The recording head 52 comprises main and return poles 66 and 68 of a high-permeability material, a pair of junctions 67, and recording coil 71. The return pole 68 is located on the trailing side of the main pole 66 and serves to efficiently close a magnetic path. The junctions 67 connect the main and return poles 66 and 68. The recording coil 71 is located so as to wind around the magnetic path including the main and return poles 66 and 68 to pass magnetic flux to the main pole 66 while a signal is being written to a magnetic disk 16. The respective lower ends of the main and return poles 66 and 68 are exposed in an ABS 43 of a slider 42. The return pole 68 functions as a high thermal conductor, and its upper end is exposed in the back surface of the slider 42.

The slider 42 is formed with a laser introduction path 58 through which a laser beam emitted from a laser light source 35 is guided to the magnetic disk 16 in the vicinity of the main pole 66. In this arrangement, the laser introduction path 58 extends between the main and return poles 66 and 68.

The reproduction head 46 comprises a magnetic film 47 having a magnetoresistive effect and shielding films 50a and 50b located on the trailing and leading sides, respectively, of the magnetic film 47 so as to sandwich the magnetic film between them. The respective lower ends of the magnetic film 47 and shielding films 50a and 50b are exposed in the ABS 43 of the slider 42.

A plurality of through-holes 76, through which a large amount of air flows to the topside of the slider 42, is formed in a suspension 34 near a head section 44. The through-holes 76 extend, for example, inclined downstream relative to airflow. As the magnetic disk 16 rotates, air introduced from above the suspension 34 flows through the through-holes 76 and passes above the return pole 68, thereby effectively cooling the return pole. Thus, heat is removed from the heated region of the magnetic disk through the return pole 68, so that the heated region can be rapidly cooled.

Further, a thermal transfer layer 77 of a material with high thermal conductivity, e.g., copper, may be formed on the whole or part of the top surface of the slider 42. The thermal transfer layer 77 is in contact with the upper end of the return pole 68. In this case, the cooling efficiency for the return pole 68 and magnetic disk can be further improved.

FIGS. 14 and 15 show an HGA 30 of an HDD according a sixth embodiment. According to the sixth embodiment, a magnetic head 17 is constructed as a dual-element magnetic head comprising separate recording and reproduction heads 52 and 46. The recording head 52 comprises main and return poles 66 and 68 of a high-permeability material, junction 67, and recording coil 71. The return pole 68 is located on the trailing side of the main pole 66 and serves to efficiently close a magnetic path. The junction 67 connects the main and return poles 66 and 68. The recording coil 71 is located so as to wind around the magnetic path including the main and return poles 66 and 68 to pass magnetic flux to the main pole 66 while a signal is being written to a magnetic disk 16. The respective lower ends of the main and return poles 66 and 68 are exposed in an ABS 43 of a slider 42. The slider 42 is formed with a laser introduction path 58 through which a laser beam emitted from a laser light source 35 is guided to the magnetic disk 16 in the vicinity of the main pole 66. In this arrangement, the laser introduction path 58 extends between the main and return poles 66 and 68.

Further, a head section 44 of the magnetic head 17 comprises a heat sink 80 of a nonmagnetic thermal conductor with high thermal conductivity located between the main and return poles 66 and 68. The heat sink 80 is in the form of a rectangular plate extending substantially at right angles to the surfaces of the magnetic disk 16. The lower end of the heat sink 80 is exposed in the ABS 43 of the slider 42, in a position upstream relative to the laser introduction path 58, that is, on the trailing end side, and constitutes a heat absorbing portion. The upper end of the heat sink 80, which functions as a contact portion, is exposed in the back or top surface of the slider 42. The junction 67 extends through an opening in the heat sink 80.

The reproduction head 46 comprises a magnetic film 47 having a magnetoresistive effect and shielding films 50a and

50b located on the trailing and leading sides, respectively, of the magnetic film 47 so as to sandwich the magnetic film between them. The respective lower ends of the magnetic film 47 and shielding films 50a and 50b are exposed in the ABS 43 of the slider 42.

A plurality (e.g., two) of distribution grooves 74, which individually extend from an inlet end 42a of the slider 42 to an outlet end 42b, are formed in the back surface of the slider 42, that is, its top surface on the suspension side. Notches 80a are formed in the upper end portion of the heat sink 80 that functions as a thermal conductor, and they are aligned with the distribution grooves 74, individually.

As the magnetic disk 16 rotates, airflow that passes through the distribution grooves 74 from its upstream end to its downstream end is produced and used to cool the heat sink 80. Thus, the heat sink 80 can always be kept at a temperature lower than that of the disk 16. Since the disk 16 is located at a distance of 10 nm or less from the magnetic head 17, its thermal conductivity is so high that thermal diffusion is caused to produce thermal conduction from the disk 16 toward the heat sink 80. Thus, the heated region of the magnetic disk 16 heated by the laser beam can be rapidly cooled by the heat sink 80. A thermal transfer layer of a material with high thermal conductivity, e.g., copper, may be formed on the inner surface of each distribution groove 74. The cooling efficiency can be further improved by doing this. Further, the number of distribution grooves is not limited to two and may be one or three or more.

Since other configurations of the HDD of the sixth embodiment are the same as those of the first embodiment, like reference numbers are used to designate like parts in the first and sixth embodiments, and a detailed description of those parts is omitted. The same functions and effects as those of the first embodiment can also be obtained from the sixth embodiment.

The heat sink 80 is not limited to a rectangular shape and may be of another shape. FIGS. 16, 17, 18, and 19 show an HGA 30 of an HDD according a seventh embodiment. According to the present embodiment, a heat sink 80 is substantially U-shaped. A lower end portion 81 of the heat sink 80 that functions as a heat absorbing portion extends transversely relative to a slider 42, that is, along the track width. The lower end surface of the heat sink 80 is exposed in an ABS 43 of the slider 42, in a position upstream relative to a laser introduction path 58, that is, on the trailing end side. Two upper end portions of the heat sink 80 that function as contact portions are individually exposed in distribution grooves 74 in the back surface of the slider 42, and they can contact airflow C.

Since other configurations of the HDD of the seventh embodiment are the same as those of the sixth embodiment, like reference numbers are used to designate like parts in the sixth and seventh embodiments, and a detailed description of those parts is omitted. The same functions and effects as those of the sixth embodiment can also be obtained from the seventh embodiment.

According to the second to seventh embodiments described above, there may also be obtained a head gimbal assembly and a disk drive provided with the same, in which degradation of recorded data can be suppressed and the linear recording density can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. In the magnetic disk drive, moreover, the numbers of magnetic disks and heads can be increased as required, and the disk size can be variously selected. Although the thermal conductor on the magnetic head is allowed to contact airflow above and beside the slider, it may alternatively be configured to contact airflow along a surface of the slider other than the disk-facing surface, e.g., the inlet or outlet end surface of the slider. The heating means is not limited to a laser beam and may alternatively be an electron beam or the like.

What is claimed is:

1. A head gimbal assembly comprising:
   a magnetic head for perpendicular recording, comprising a slider and a head section thereon and configured to record data in a recording medium;
   a suspension supporting the magnetic head; and
   a heating module configured to locally heat a recording area of the recording medium,
   the head section comprising:
   a magnetic core comprising a main pole configured to produce a recording magnetic field, and a return pole opposed to a trailing side of the main pole with a gap to form a magnetic circuit in conjunction with the main pole,
   a coil configured to excite magnetic flux in the magnetic circuit, and
   a thermal conductor having thermal conductivity higher than thermal conductivity of the recording medium and comprising a heat absorbing portion configured to oppose the recording medium in the vicinity of the heated region of the recording medium and remove heat from the recording medium, and a contact portion configured to contact airflow produced, as the recording medium rotates, at a position other than a facing surface of the slider opposed to the recording medium and radiate heat.

2. The head gimbal assembly of claim 1, wherein the magnetic core constitutes the thermal conductor.

3. The head gimbal assembly of claim 2, wherein the return pole constitutes the thermal conductor.

4. The head gimbal assembly of claim 1, wherein the thermal conductor comprises a heat sink arranged between the main pole and the return pole.

5. The head gimbal assembly of claim 1, wherein the contact portion of the thermal conductor projects outward from a back surface of the slider opposite to the recording medium.

6. The head gimbal assembly of claim 1, wherein the magnetic head comprises a thermal transfer layer formed on a back surface of the slider opposite to the recording medium, and the contact portion of the thermal conductor is in contact with the thermal transfer layer.

7. The head gimbal assembly of claim 6, wherein the suspension comprises a through-hole through which the airflow is guided to the back surface of the slider.

8. The head gimbal assembly of claim 1, wherein the slider comprises a distribution groove which extends from an air inlet end side toward an air outlet end side and through which the airflow is passed, and the contact portion of the thermal conductor is in contact with the distribution groove.

9. A disk drive comprising:

a recording medium comprising a recording layer having a magnetic anisotropy perpendicular to a surface of the medium;

a drive module configured to rotate the recording medium; and a head gimbal assembly comprising a magnetic head for perpendicular recording comprising a slider and a head section thereon and configured to record data in the recording medium, a suspension supporting the magnetic head, and a heating module configured to locally heat a recording area of the recording medium, the head section comprising:

a magnetic core comprising a main pole configured to produce a recording magnetic field, and a return pole opposed to a trailing side of the main pole with a gap to form a magnetic circuit in conjunction with the main pole, a coil configured to excite magnetic flux in the magnetic circuit, and a thermal conductor having thermal conductivity higher than thermal conductivity of the recording medium and comprising a heat absorbing portion configured to oppose the recording medium in the vicinity of the heated region of the recording medium and remove heat from the recording medium, and a contact portion configured to contact airflow produced, as the recording medium rotates, at a position other than a facing surface of the slider opposed to the recording medium and radiate heat.

10. The disk drive of claim 9, wherein the magnetic core constitutes the thermal conductor.

11. The disk drive of claim 10, wherein the return pole constitutes the thermal conductor.

12. The disk drive of claim 9, wherein the thermal conductor comprises a heat sink arranged between the main pole and the return pole.

13. The disk drive of claim 9, wherein the contact portion of the thermal conductor projects outward from a back surface of the slider opposite to the recording medium.

14. The disk drive of claim 9, wherein the magnetic head comprises a thermal transfer layer formed on a back surface of the slider opposite to the recording medium, and the contact portion of the thermal conductor is in contact with the thermal transfer layer.

15. The disk drive of claim 14, wherein the suspension comprises a through-hole through which the airflow is guided to the back surface of the slider.

16. The disk drive of claim 9, wherein the slider comprises a distribution groove which extends from an air inlet end side toward an air outlet end side and through which the airflow is passed, and the contact portion of the thermal conductor is in contact with the distribution groove.

* * * * *